Jan. 15, 1957  S. C. HETH  2,777,273
SNAPPING ROLL OPENING DEVICE FOR CORN PICKERS
Filed Oct. 1, 1953  4 Sheets-Sheet 1

*INVENTOR.*
SHERMAN C. HETH
BY Andrus & Sceales
Attorneys

INVENTOR.
SHERMAN C. HETH

Jan. 15, 1957 S. C. HETH 2,777,273
SNAPPING ROLL OPENING DEVICE FOR CORN PICKERS
Filed Oct. 1, 1953 4 Sheets-Sheet 3

INVENTOR.
SHERMAN C. HETH
BY
Andrus & Sceales
Attorneys

Jan. 15, 1957 S. C. HETH 2,777,273
SNAPPING ROLL OPENING DEVICE FOR CORN PICKERS
Filed Oct. 1, 1953 4 Sheets-Sheet 4
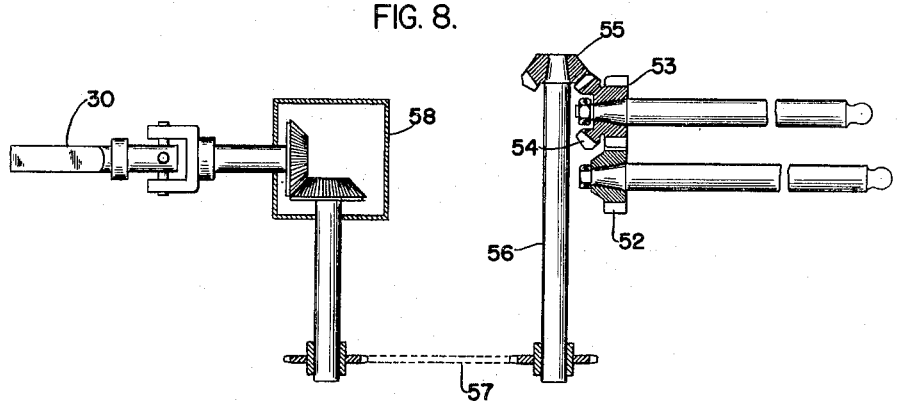
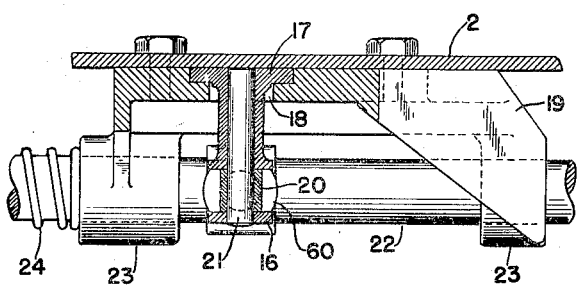
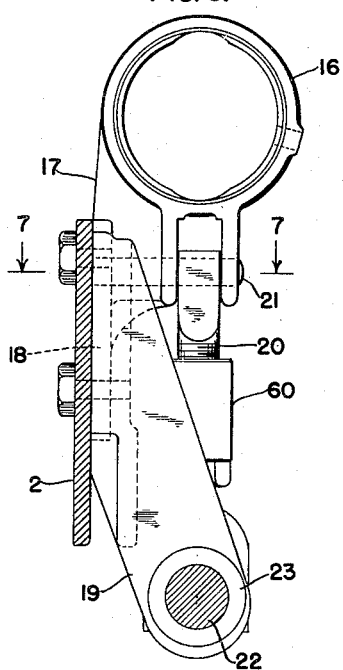
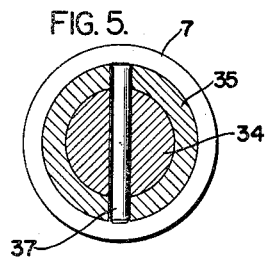
*INVENTOR.*
SHERMAN C. HETH
BY
*Attorneys*

# United States Patent Office 2,777,273
Patented Jan. 15, 1957

2,777,273

SNAPPING ROLL OPENING DEVICE FOR CORN PICKERS

Sherman C. Heth, Racine, Wis., assignor to J. I. Case Company, Racine, Wis., a company of Wisconsin Application October 1, 1953, Serial No. 383,470

2 Claims. (Cl. 56—104)

This invention relates to a snapping roll opening device for corn pickers. The invention has particular importance in relieving clogging of the rolls during operation.

Heretofore, corn pickers have employed rigidly mounted picker or snapping rolls for receiving therebetween the corn stalks and snapping the ears therefrom, after which the ears pass over the husking rolls and are picked up by a discharge conveyor. In operating such pickers the picker rolls often become clogged with stalks and cease functioning to snap the ears therefrom. When this occurs the operator has generally tried to remove the clogged material by hand or by a suitable stick while the rolls are rotating with the result that in a number of instances the operator has accidentally had his arm drawn into the rolls and mutilated.

Attempts have been made to remove the hazard by providing means to open or separate the picker rolls at their forward lower ends; but such a construction does not provide the necessary relief at the upper end where the clogging is usually most severe.

The present invention solves the problem and eliminates the hazard by opening or separating the upper end of the picker or snapping rolls and without interfering with the roll drive. The mechanism for accomplishing this provides a lever within the convenient reach of the operator for opening and closing the rolls at will anytime during operating of the picker. When the rolls are closed in operating relation they are rigidly supported in fixed bearings.

In carrying out the invention at least one of the upper bearings for the snapping rolls is made movable relative to the other in response to lever actuation by the operator. A toggle mechanism interposed between the lever and movable bearing secures the latter in fixed position during normal operation of the picker. The thrust of the snapping rolls is transmitted to the husking rolls and from them to suitable thrust bearings at the rear end of the husking rolls.

The drawings furnished herewith illustrate the best mode of carrying out the invention as presently contemplated and set forth hereinafter.

In the drawings:

Fig. 5 is an enlarged detail transverse vertical section taken on line 5—5 of Fig. 3;

Fig. 6 is an enlarged elevational view showing the bearing slide and T-slot support therefor;

Fig. 7 is a section taken on line 7—7 of Fig. 6;

Fig. 8 is a schematic showing of the power drive; and

Figure 1:
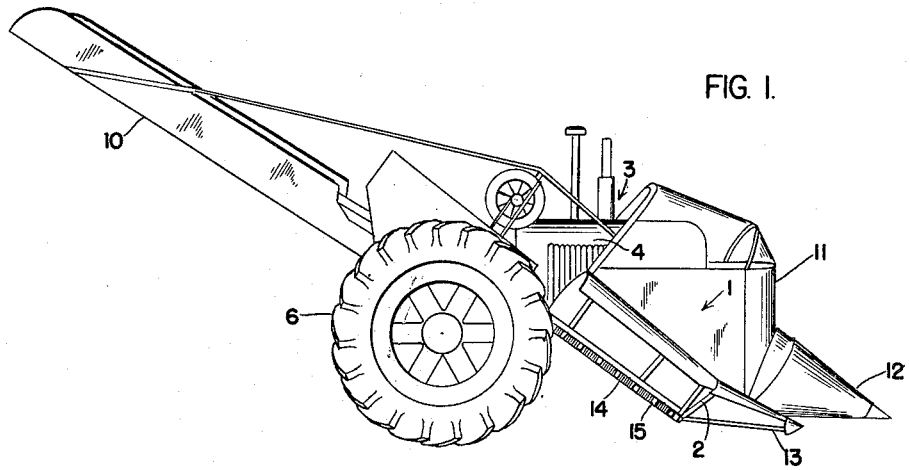
Figure 1 is a side elevation of a typical tractor mounted corn picker in which the present invention has been embodied.
Figure 2:
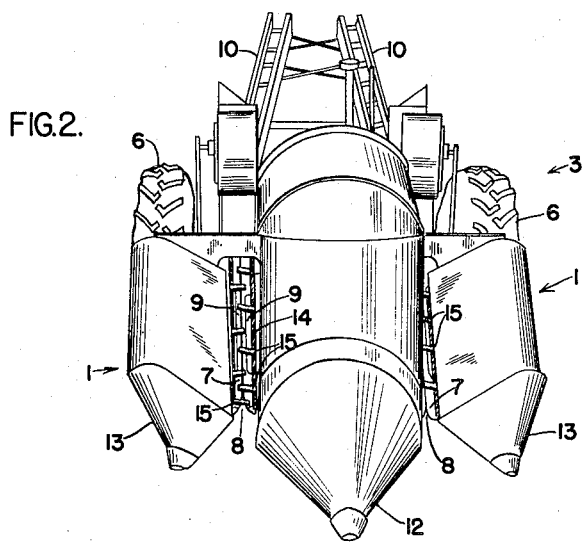
Fig. 2 is a front elevation of the picker.
Figure 9:
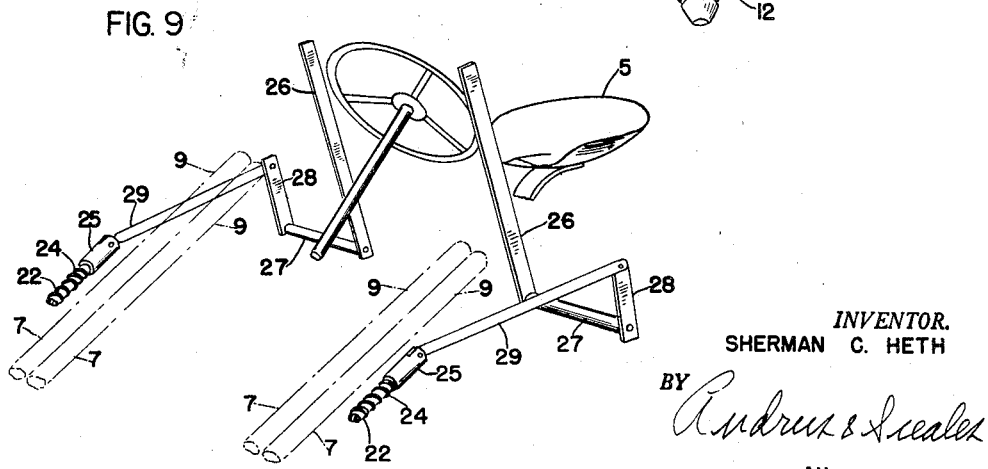
Fig. 9 is a schematic showing of the lever mechanism for operating the device.
Figure 3:
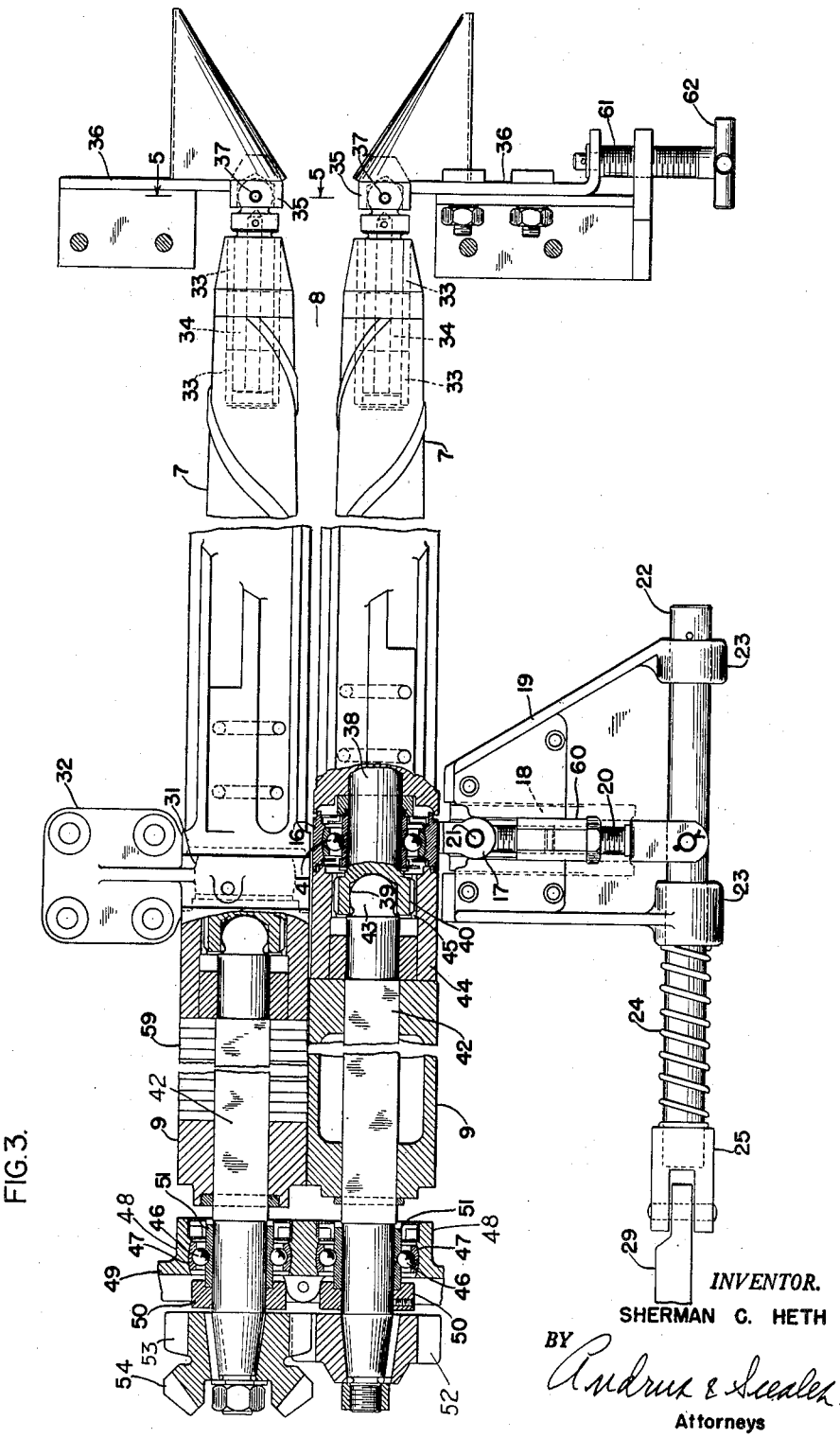
Fig. 3 is an enlarged detail bottom plan view of a pair of snapping rolls and the corresponding husking rolls with the latter and certain bearings and parts sectioned.
Figure 4:
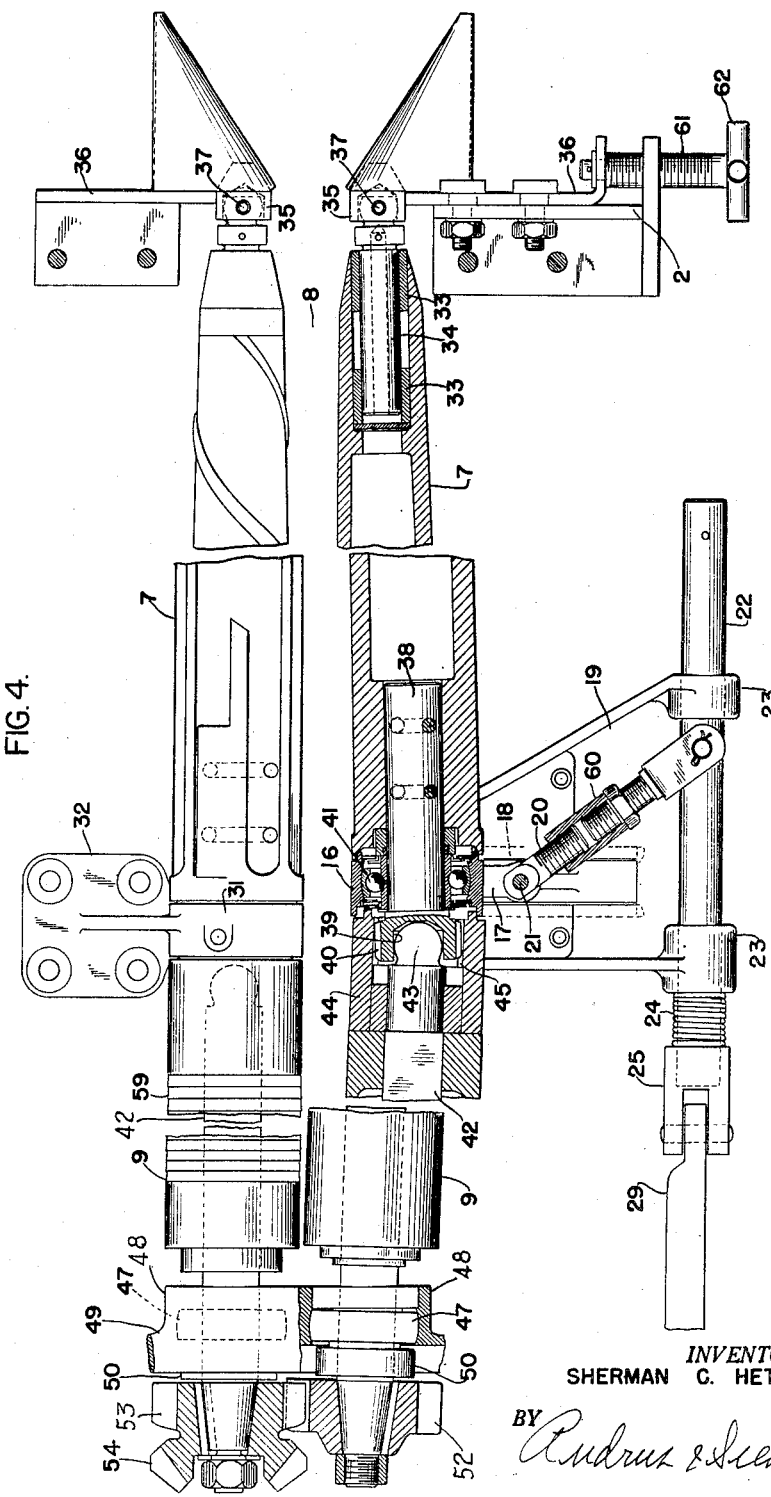
Fig. 4 is a view similar to Fig. 3 showing the rolls opened.

Tractor mounted corn pickers are made generally of the one row and two row types. The picker illustrated in the drawing is of the two row type, which may be considered the same as two single row picker units 1 secured together by a suitable frame 2 and carried by the tractor 3 with the engine 4 of the tractor and the seat 5 for the operator disposed between the picker units 1 and with the rear drive wheels 6 of the tractor disposed outwardly of the picker units.

Each picker unit 1 comprises a pair of tapered inclined picking or snapping rolls 7 presenting a slot 8 therebetween having an open mouth at the forward end of the rolls. A pair of husking rolls 9 is disposed at the upper end of the snapping rolls 7 with the surfaces of the husking rolls in contact with each other and constructed to remove the husks from the ears of corn as the latter pass longitudinally of the rolls. A suitable upwardly and rearwardly inclined discharge conveyor 10 is disposed to receive the husked ears of corn from the husking rolls and to discharge the same into a wagon.

A hood 11 extends alongside of the two picker units 1 and provides a central divider point 12 and outer divider points 13, for guiding the corn stalks into the mouths of the respective slots 8. A pair of feeder chains 14 is provided for each unit 1 with the feed course of each chain disposed above a corresponding snapping roll 7, and with the lugs 15 on the corresponding chains extending over slot 8 to assist in feeding stalks rearwardly of the rolls 7.

In carrying out the present invention the upper end of at least one of the rolls 7 is made laterally movable relative to the other roll 7 in each unit 1 so that slot 8 may be opened at any time for relieving any clogging of the rolls.

In the embodiment illustrated the bearing housing 16 at the upper end of the outer snapping roll in each picker unit is mounted for lateral movement to carry out the invention.

For this purpose, the bearing housing 16 is rigidly carried by a bracket 17 having its base riding in a T-slot 18 in a support bracket 19 bolted to the frame 2 of the picker, the T-slot 18 being disposed transverse to the axis of the bearing housing 16 and in the general plane of the rolls 7 of the unit.

The position of bracket 17 in T-slot 18 is determined by a toggle link 20 having its inner end disposed between a pair of integral lugs on bearing housing 16 and bracket 17, and pivoted thereto by the pin 21.

The outer end of link 20 is pivotally carried by an actuating plunger 22 suitably mounted for longitudinal movement in fixed bearing brackets 23 carried by the picker frame 2.

When the position of plunger 22 secures the link 20 at right angles to the axis of bearing housing 16 the latter is maintained rigidly in operative position wherein the rolls are closed. When plunger 22 is moved forwardly to dispose link 20 at an acute angle to the axis of bearing housing 16 the latter is moved to an outer position wherein the rolls are open.

Plunger 22 is biased at all times to the roll closed position by means of a suitable coil spring 24 thereon and which is disposed between the rearmost bracket 23 and a head 25 on the rear end of the plunger.

The plunger 22 is manually actuated against the biasing force of spring 24 by means of any suitable lever mechanism. The lever mechanism illustrated comprises a hand lever 26 at a convenient location with respect to the operator on seat 5, a pivot shaft 27 carrying lever 26 and extending beneath the corresponding unit 1, a lever 28 secured to the outer end of shaft 27, and a link 29 connecting crank 28 to head 25 on plunger 22.

The hand levers 26 for the units 1 are located on the inside between the units and are on the opposite sides of the operator as he occupies seat 5. The shaft 27 is located just behind the power take off gearing 30 for the respective unit 1 and is protected thereby from the action of stalks passing to the rear beneath the unit after snapping of the corn ears from the stalks.

The bearing housing 31 for the upper end of the inner roll 7 corresponds to bearing housing 16 for the outer roll and is constructed similarly with the exception of the fact that it is shown as fixed in bracket 32 which is secured to the frame 2.

The rolls 7 are hollow and the lower end of each roll carries a pair of bearing bushings 33 which receive the non-rotatable axial spindles 34. The bearing spindles 34 extend into sockets 35 in brackets 36 carried by the frame and are pivoted in the sockets by means of upright pivot pins 37.

The front ends of spindles 34 are made generally spherical to bear closely against the walls of sockets 35, while pins 37 are made loose so that all lateral thrust is taken directly between the balls of the spindles and their corresponding sockets. In this way the pins 37 merely retain the spherical end of the spindles within sockets 35, and prevent turning of spindles 34, and provide for freedom of lateral deflection of the rolls without damage to the bearings. The pin 37 for each outer roll 7 additionally provides for the angular movement of the roll by outward movement of bearing 16 as previously described.

The upper ends of hollow rolls 7 are secured upon drive spindles 38 which extend through the corresponding bearing housings 16 and 31 and have their enlarged outer ends forming hollow sockets 39 with spline teeth 40 on the outer surface thereof for coupling to the corresponding rolls 9.

Suitable ball bearings 41 are provided upon spindles 38 within the corresponding bearing housings 16 and 31. The outer races for bearings 41 are shaped as a segment of a sphere and the inner surfaces of bearing housings 16 and 31 are similarly shaped to provide for freedom of deflection of rolls 7 under load without injury to the bearings and to provide for angular displacement of either roll upon separation in accordance with the present invention.

Each of the husking rolls 9 is carried upon an axial shaft 42 having a ball 43 at its forward end disposed within the corresponding socket 39 of a spindle 38 to receive the thrust from the corresponding roll 7 and to provide a radial bearing support for the respective husking roll.

The forward end of each husking roll 9 comprises a tubular member 44 secured upon the shaft 42 and having inner spline teeth 45 adapted to loosely mesh with spline teeth 40 upon the corresponding spindle 38 to provide a driving connection between corresponding rolls 7 and 9. The loose fit of spline teeth 40 and 45 provides freedom for deflection of rolls 7 under load and additionally for the angular opening of the rolls when bearing housing 16 is moved laterally by means of hand lever 26 and the toggle link 20.

The rear ends of husking rolls 9 are rotationally supported by ball thrust and radial bearings 46 on the rear ends of shafts 42 and which have outer races 47 with outer surfaces constituting segments of a sphere and riding in complementarily shaped housings 48 integrally a part of bracket 49 secured to the frame 2.

A collar 50 is secured on the rear end of each shaft 42 and carries with it the inner race 51 for bearing 46 whereby the axial location of the corresponding rolls 9 and 7 may be determined and adjusted with respect to bearing 46 and the frame 2 during assembly.

The outer rolls 7 and 9 are driven by a gear 52 secured upon the rear end of the outer shaft 42 and loosely meshing with a drive gear 53 secured upon the rear end of the inner shaft 42. The direction of rotation of the rolls provides a downward movement of their adjacent surfaces.

Gear 53 has a bevel gear 54 formed integrally thereon and disposed to mesh with a drive gear 55 on a cross shaft 56 suitably driven by a chain 57 from a gear box 58, which in turn is driven by the corresponding power take off gearing 30 for the unit.

The husking rolls 9 shown are of a construction adapted to husk ears of corn passing thereover. For this purpose the outer roll 9 is constructed with a smooth cylindrical cast iron surface and the inner roll 9 has a rubber surface made up of a series of frusto-conical sections 59 the tips of which engage the outer surface of the cast iron roll.

The rolls 9 are generally in alignment with the corresponding rolls 7 and the balls 43 and sockets 39 serve to provide for axial thrust therebetween and for radial support of the forward ends of rolls 9.

In the operation of the present invention in the event rolls 7 become clogged at any time, the operator may move the corresponding lever 26 to release toggle links 20 and move bearing housing 16 outwardly to open the rolls and release the clogged material, whereupon the operator releases the lever 26 and allows spring 24 to return the toggle link 20 to its normal position holding the rolls closed. In practice it has been found sufficient to open the rolls about an inch.

While in the embodiment shown only the outer roll is moved to open the rolls it will be understood that either or both of the rolls may be moved to effect the desired opening by duplicating the roll release mechanism.

At times it may become desirable to adjust the closing of the rolls. For this purpose each toggle link 20 is made adjustable in length by means of a threaded turnbuckle connection 60 intermediate the ends thereof to adjust the closing of the rear ends of rolls 7. The forward ends of the rolls 7 are relatively adjusted by mounting outer socket bracket 36 to slide laterally relative to the frame 2 and providing a threaded thrust member 61 with a T handle 62 for securing the bracket in any desired position of adjustment.

Various modes of carrying out the invention are contemplated as within the scope of the following claims particularly pointing out and distinctly claiming the subject matter which is regarded as the invention.

I claim:

1. A corn picker having means to open the snapping rolls thereof to relieve clogging, comprising a mobile frame for field operation, a pair of upwardly and rearwardly inclined snapping rolls carried by said frame and spaced laterally to provide a slot therebetween for receiving standing corn stalks as the picker travels along a row of corn in a field, means carried by said frame and disposed adjacent the slot between said snapping rolls to feed the stalks along the slot, drive means carried by said frame and connected to said snapping rolls to rotate the same in a direction tending to pull the stalks therebetween to snap the ears of corn from the stalks, relatively fixed bearing means carried by said frame for supporting the lower ends of the snapping rolls, relatively separable bearing means rotatably supporting the corresponding upper ends of the snapping rolls, a toggle mechanism carried by said frame and including a link connected to the upper bearing for one of said snapping rolls and normally disposed at its dead-center position to secure said rolls in a given operable position, manually operable means including a handle located immediate to the operator's position and connected to said toggle mechanism to move the link away from dead-center and effect a momentary separation of said rolls to relieve clogging thereof at any selected time during operation of the rolls, said mechanism further including spring means to return said toggle link to dead-center and positively restore said rolls to said given operable position upon release of said handle.

2. The invention of claim 1 wherein the link is separately adjustable as to its length and provides a preselected adjustment of the corresponding bearing and snapping roll relative to the other of said snapping rolls.

References Cited in the file of this patent

UNITED STATES PATENTS

| | | |
|---|---|---|
| 1,160,777 | Small | Nov. 16, 1915 |
| 1,419,895 | O'Neill et al. | June 13, 1922 |
| 2,491,777 | Smith | Dec. 20, 1949 |
| 2,560,801 | Kuhlman | July 17, 1951 |